(12) United States Patent
Morley et al.

(10) Patent No.: US 8,393,181 B1
(45) Date of Patent: Mar. 12, 2013

(54) ATRAUMATIC FIBER GUIDE

(75) Inventors: Scott W. Morley, Pittsburgh, PA (US); William Kucic, Pittsburgh, PA (US)

(73) Assignee: ALung Technologies, Inc., Pittsburgh, PA (US)

( * ) Notice: Subject to any disclaimer, the term of this patent is extended or adjusted under 35 U.S.C. 154(b) by 30 days.

(21) Appl. No.: 13/226,555

(22) Filed: Sep. 7, 2011

(51) Int. Cl.
*D04B 15/54* (2006.01)
(52) U.S. Cl. .......................................... 66/131
(58) Field of Classification Search ................ 66/125 R, 66/132 R, 145 R, 146, 131; 242/147 R, 155 R, 242/157 R, 615, 615.3, 615.4
See application file for complete search history.

(56) References Cited

U.S. PATENT DOCUMENTS

| | | | |
|---|---|---|---|
| 1,082,618 A * | 12/1913 | Babcock | 362/60 |
| 4,080,919 A * | 3/1978 | Holland et al. | 114/204 |
| 4,226,378 A | 10/1980 | Fitzgerald et al. | |
| 4,598,560 A * | 7/1986 | Sawazaki | 66/132 T |
| 5,400,476 A * | 3/1995 | White | 19/239 |
| 5,513,503 A * | 5/1996 | Gray et al. | 66/125 R |
| 6,016,650 A | 1/2000 | Legron | |
| 6,182,475 B1 | 2/2001 | Lee | |
| 2010/0051180 A1 | 3/2010 | Barra et al. | |

FOREIGN PATENT DOCUMENTS

| | | |
|---|---|---|
| JP | 6093543 | 4/1994 |
| JP | 6210141 | 8/1994 |
| JP | 8299763 | 11/1996 |
| JP | 2004204400 | 7/2004 |
| JP | 2008196066 | 8/2008 |

OTHER PUBLICATIONS

Design Guide for Cable Solutions. Catalog [online]. Carl Stahl Sava Industries, Inc, 2006 [retrieved on Mar. 1, 2012]. Retrieved from internet http:llweb.archive.orglwebl201008010836071http:l164.201.227.3/sava/sava_cat.pdf >.*

* cited by examiner

*Primary Examiner* — Danny Worrell
(74) *Attorney, Agent, or Firm* — Lynch Weis, LLC; Kathleen Kuznicki

(57) ABSTRACT

The present invention discloses a fiber guide that can be used to feed delicate fibers into a machine, for example, the feeding of hollow fibers into a knitting machine. The disclosed guide utilizes dynamic friction and provides for horizontal and front-to-back positioning of the delicate fiber, keeping the delicate fiber vertically aligned while being fed into a machine. Utilizing dynamic friction and maintaining vertical alignment prevents damage to the delicate fiber. The guide also provides for the delicate fiber to be fed from a plurality of overhead angles from a feeding mechanism.

22 Claims, 8 Drawing Sheets

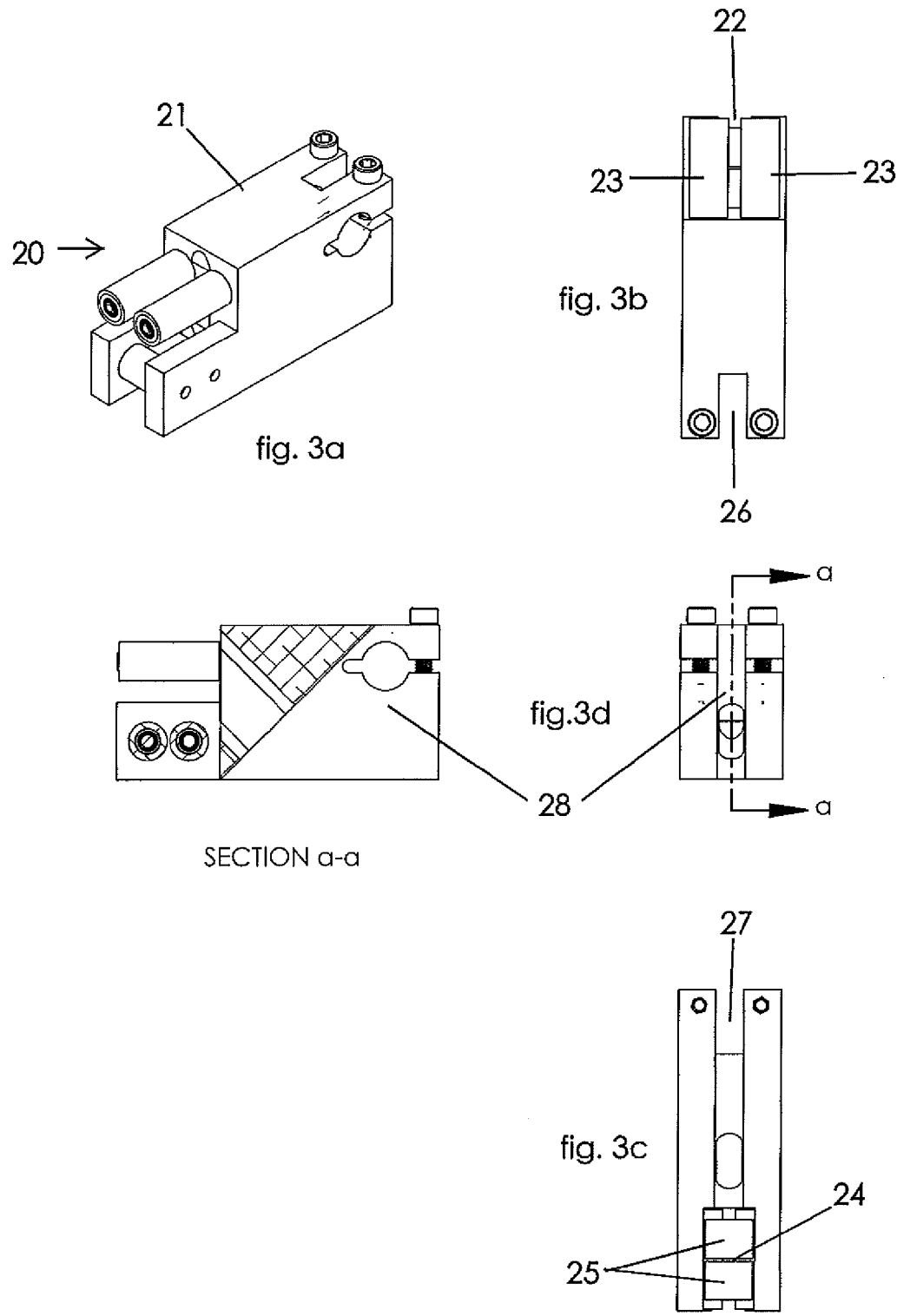

ATRAUMATIC FIBER GUIDE

BACKGROUND

Hollow fiber membranes are essential components of artificial lung systems. These hollow fiber mats are required for removing carbon dioxide or for adding oxygen to patient's blood via extracorporeal circulation. Hollow fibers are manufactured in various ways as seen in U.S. 2010/051180 A1, U.S. Pat. No. 4,226,378, and JP 8299763. The hollow fibers used to construct these mats are delicate. For example, the hollow fibers used in the Hemolung Cartridge of the Hemolung Respiratory Assist System are composed of polypropylene and are approximately 300 microns in diameter and with a 30 micron wall thickness. Hollow fibers can also be coated with coatings such as siloxane. Problems arise when guiding the hollow fiber into a knitting machine. A variety of tools have been traditionally utilized to guide fibers and yarns into knitting machines. These tools in many cases utilize ceramic wear surfaces which are extremely hard and have low coefficients of friction. Metal guides as well as combination ceramic/metal guides have been utilized to insert the hollow fiber into the knitting machine. For example, one type of guide is essentially a tube through which the coated hollow fiber passes. The tube is mounted to an arm which moves back and forth to lay the hollow fiber into position. Despite using ceramic contact surfaces, the tube guide damages the siloxane coating on the hollow fibers. Microscopic analysis shows that siloxane coating had been scrapped off. Also the severe sharp exit angle of the tube caused flattening of the hollow fiber. A guide that utilizes dynamic friction and that keeps the hollow fiber aligned without bending as it is being fed into a knitting machine is necessary.

One attempt to solve the problem of causing damage to the hollow fiber is seen in JP 2008-196066A which describes a guide utilizing dynamic rollers for a Russell knitting machine. A hollow fiber passes through a complex tension apparatus eventually looping over a horizontal roller in a fixed position that feeds the hollow fiber in between the vertical rollers. These vertical rollers are set in parallel, are spaced apart, and are always in a fixed position. The hollow fiber then passes through a pair of closely set rollers that feed into a Russel knitting machine. These rollers move horizontally in the knitting machine via a conveyor belt mechanism. In the extreme horizontal positions the vertical rollers maintain horizontal alignment, but this design does not provide for front to back alignment roller guides. It also has the disadvantage of not providing for a plurality of top entry angles and therefore is not very adaptable to other systems. Another disadvantage is that any alteration in hollow fiber feeding process requires manual readjustment. Other yarn guides for feeding knitting or spinning machines can be found in U.S. Pat. No. 6,182,475 B1, U.S. Pat. No. 6,016,650, JP 2004-204400, and JP 6093543, but none of these singularly resolve the above discussed issues.

There is a need for a delicate fiber guide that utilizes dynamic friction and that provides for the horizontal and the front to back positioning of the delicate fiber, keeping it vertically aligned as it is being fed, for example into a knitting machine. There is also a need for a guide that allows for the delicate fiber to be fed from plurality of overhead angles.

SUMMARY

The present invention is a device for guiding delicate fibers used for making membranes, such as hollow fibers, in an atraumatic way. Damage is prevented by utilizing dynamic friction and by perfectly aligning the delicate fiber. One use for the guide is to feed hollow fibers into any suitable knitting machine, including for example, a rachel knitting machine. The guide comprises a bottom guide and a top guide connected in such a way that they move as singular unit, preferably utilizing a rod and clamp configuration. In a preferred embodiment, the bottom guide feeds directly into a knitting machine and the top guide receives the delicate fiber from a feeding mechanism. In a preferred embodiment, the bottom guide is comprised of a pair of pulley wheels attached to a bottom support. The top guide is comprised of a top support with at least two pairs of rollers vertically arranged in a perpendicular orientation relative to one another. The uppermost rollers align the delicate fiber in a side to side orientation and are spaced apart enough to allow the delicate fiber to be fed from a plurality of angles. The lowermost rollers are perpendicularly oriented relative to the uppermost rollers and align the delicate fiber in the front to back orientation. It is preferred that the lowermost rollers be narrowly spaced apart and it is most preferred that space be aligned over the bottom guide pulley wheels. It is most preferred that the top guide only has two pairs of top guide rollers arranged in the manner described above. All rollers and pulleys are smooth and made of lightweight material such as acetal copolymer or titanium. All rollers and pulleys should also be freely rotating. Preferably, the free rotation is enabled by precision ball bearing structures. This virtually eliminates static friction and prevents the coating on the delicate fibers from being scrapped or rubbed off. It is also preferred that the top and bottom supports are made of lightweight material such as aluminum or titanium.

Other features and advantages of the invention will become apparent from the following detailed description taken in conjunction with the accompanying drawings, which illustrate by way of example the features of the invention.

BRIEF DESCRIPTION OF THE DRAWINGS

FIG. 3a depicts a top guide of the present invention.
FIG. 3b is a top view of an embodiment of the top guide.
FIG. 3c is a bottom view of an embodiment of the top guide.
FIG. 3d is a back view of an embodiment of the top guide.

DETAILED DESCRIPTION

Traditionally, several types of yarn guides have been used for guiding fibers. These yarn guides are not always suitable for delicate fibers such as hollow fibers. Hollow fibers can be damaged by bending them to the point that they are flattened, and in some cases by rubbing or scrapping off a coating. In accordance with the present invention, damage is prevented by utilizing dynamic friction in conjunction with aligning the fiber in the side to side and the front to back orientations. Additional advantages of the present invention include the capacity to feed the fiber from plurality of overhead entry angles and the capability of self-adjustment. In accordance with the present invention, at least two pairs of top guide rollers arranged vertically in perpendicular orientation to one another guide the fiber to be aligned with the bottom guide. Any suitable bottom guide is contemplated by the invention. Alignment is achieved by having uppermost rollers that align the fiber in a side to side orientation and that are spaced apart enough to allow the hollow fiber to be fed from a plurality of angles. The lowermost rollers are perpendicularly oriented relative to the uppermost rollers and align the fiber in the front to back orientation. It is preferred that the lowermost rollers be narrowly spaced apart and it is most preferred that they be aligned over a bottom guide that utilizes pulley wheels. It is most preferred that the top guide only has two pairs of top guide rollers arranged in the manner described above. This arrangement in particular prevents the flattening and the scrapping of delicate hollow fibers while being fed into a knitting machine. Any suitable system in which it is necessary to guide delicate fiber for making a membrane is contemplated by the invention. To understand the invention, it is best to refer to the descriptions of the figures, which are for illustration purposes only. The present invention is not limited to the embodiments described in these figures.

Figure 1:
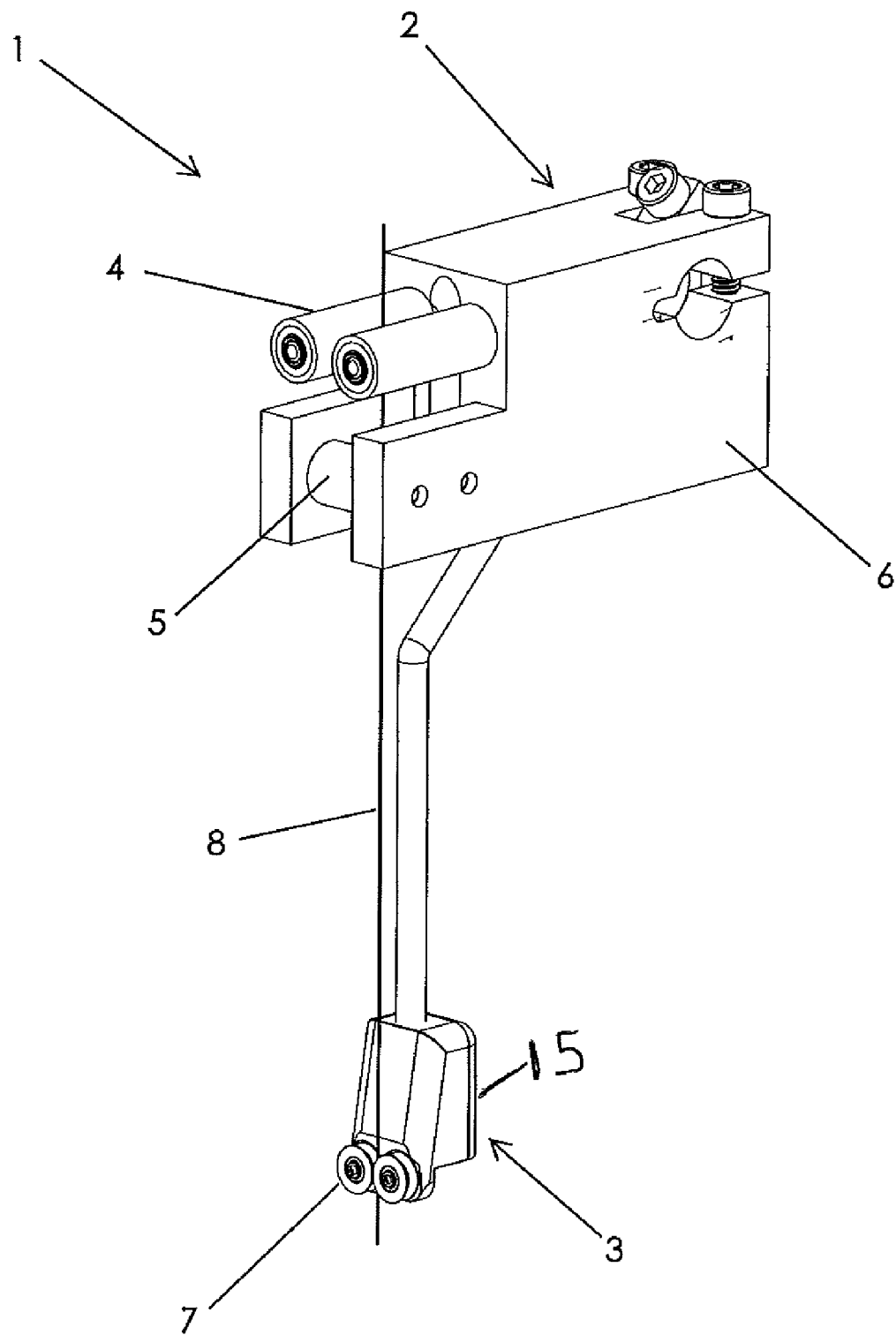
FIG. 1 is an isometric view of an embodiment of the guide.

FIG. 1 is an isometric view of the delicate fiber guide. Guide 1 is comprised of top guide 2 and bottom guide 3. Top guide 2 is comprised of a freely rotating uppermost pair of rollers 4 and a freely rotating lowermost pair of rollers 5, attached to a top support 6. Bottom guide 3 is comprised of pulleys 7 attached to a support 15. As delicate fiber 8 passes through rollers 4 and rollers 5 down through pulleys 7, it is vertically aligned.

Figure 2:
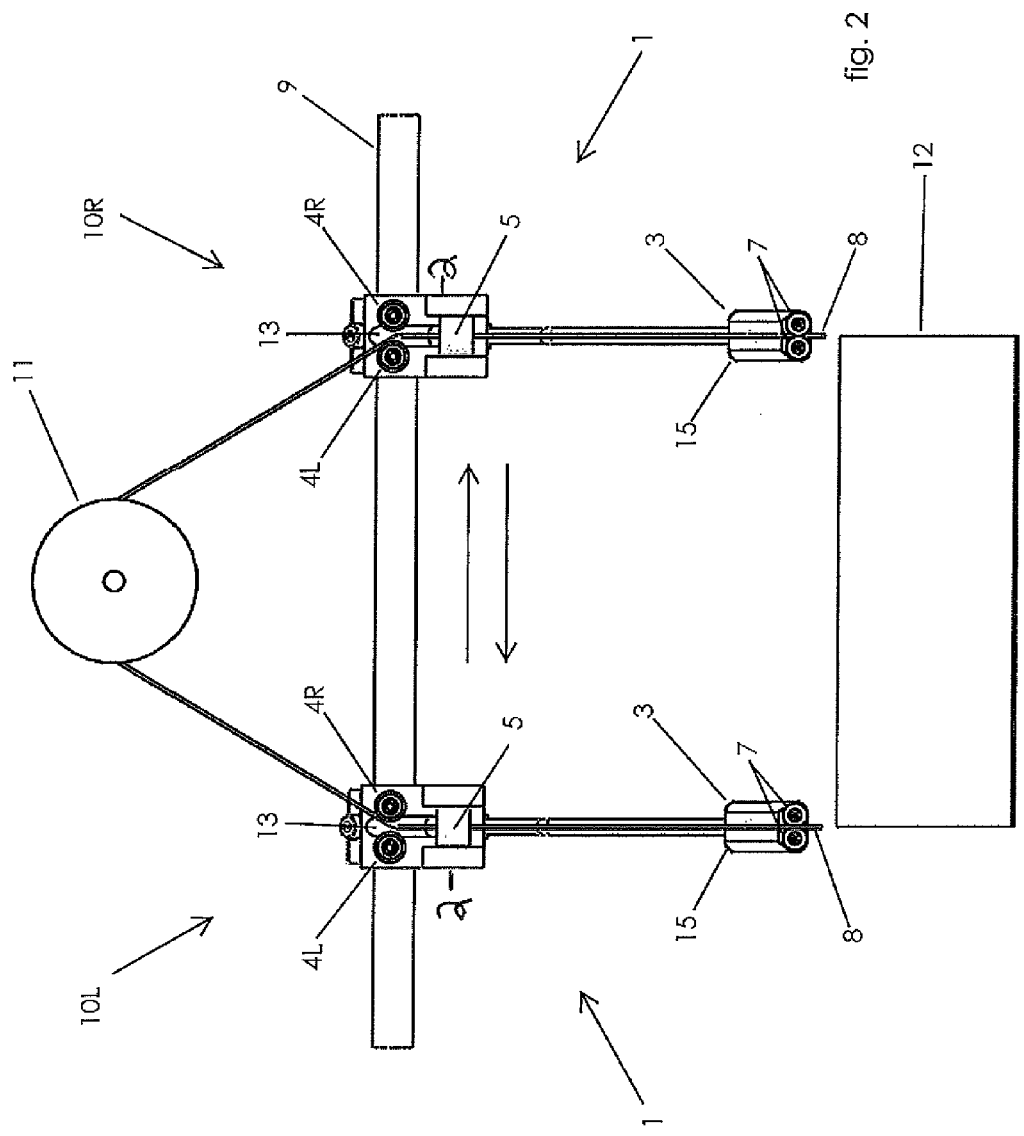
FIG. 2 is a front view of an embodiment of the guide moving on a knitting machine.

FIG. 2 shows a front view of guide 1 attached to bar 9 of a knitting machine (not shown) and is depict in two positions 10L and 10R. Delicate fiber 8 comes from feeder mechanism 11 (any suitable one is contemplated by invention), passes through and is vertically aligned by top guide 2 and is then fed by bottom guide 3 into the knitting machine to be laid down as the weft fiber in fiber mat 12. Bar 9 represents the horizontal moving component of a knitting machine and movement of bar 9 carries the guide 1 back and forth between the horizontal extreme positions of 10L and 10R. At position 10L, guide 1 has just finished laying down delicate fiber 8 in the right to left direction and is in position to begin laying down the delicate fiber in the left to right direction. As the guide moves from 10L to 10R as depicted by an arrow, the delicate fiber 8 at first passes over roller 4R in the 10L position, as guide 1 moves more central, delicate fiber 8 passes through gap 13 and finally as guide 1 moves into 10R position delicate fiber 8 passes over roller 4L. This design allows the feeder mechanism 11 to be fixed in a variety of overhead positions, while keeping delicate fiber 8 aligned horizontally. The size of gap 13 needs to be sufficiently wide to allow for multiple angle entry of delicate fiber 8, but restrictive enough to still allow for horizontal alignment. Delicate fiber 8 then passes through lowermost pair of rollers 5 which are oriented perpendicular to the uppermost rollers and preferably spaced apart the to be aligned with the pulley wheels 7 of bottom guide 3. Pulley wheels 7 are attached to bottom support 15 and are set close together in parallel and so that delicate fiber 8 passes through them essentially vertically and to be taken up by knitting machine and placed in fiber mat 12. Any top guide encompassing the uppermost and lowermost roller arrangement described above is contemplated by invention. For example a plurality of pairs of rollers can be placed in between the above described uppermost and lowermost rollers, or other types of guiding mechanisms can be placed in between them.

Though the invention contemplates any suitable top support design in a top guide that utilizes the roller arrangement described above, FIG. 3 depicts several views of a preferred embodiment of a top guide. The top guide 20 depicted in FIG. 3a with top support 21 works well with rachel knitting machine, but can be utilized on any suitable machine. FIG. 3b is top view of the top guide clearly showing the gap 22 between uppermost rollers 23. FIG. 3c is a bottom view clearly showing the narrow gap 24 between lowermost rollers 25.

Figure 4A:
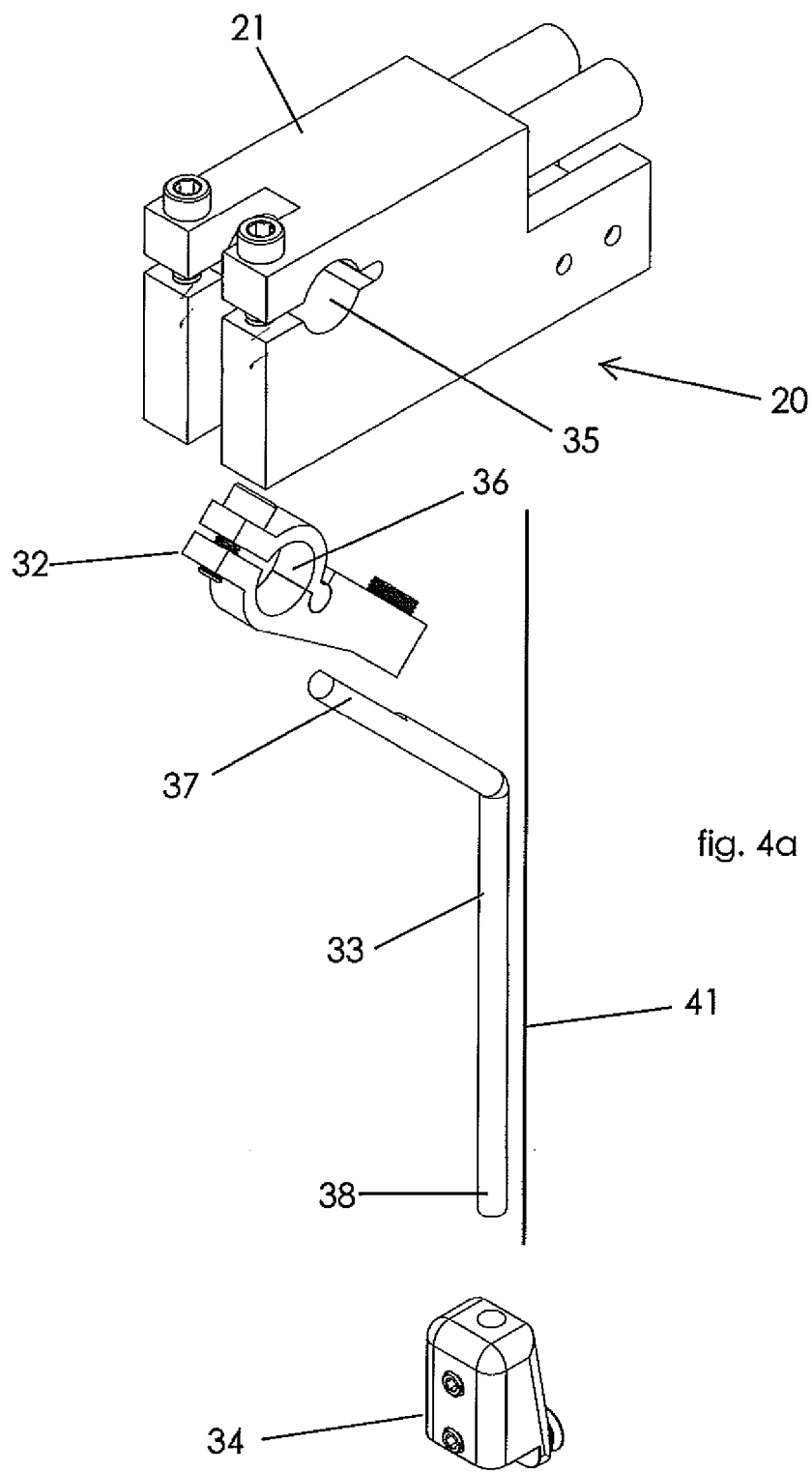
FIG. 4a is an exploded view of an embodiment of the guide.
Figure 4B:
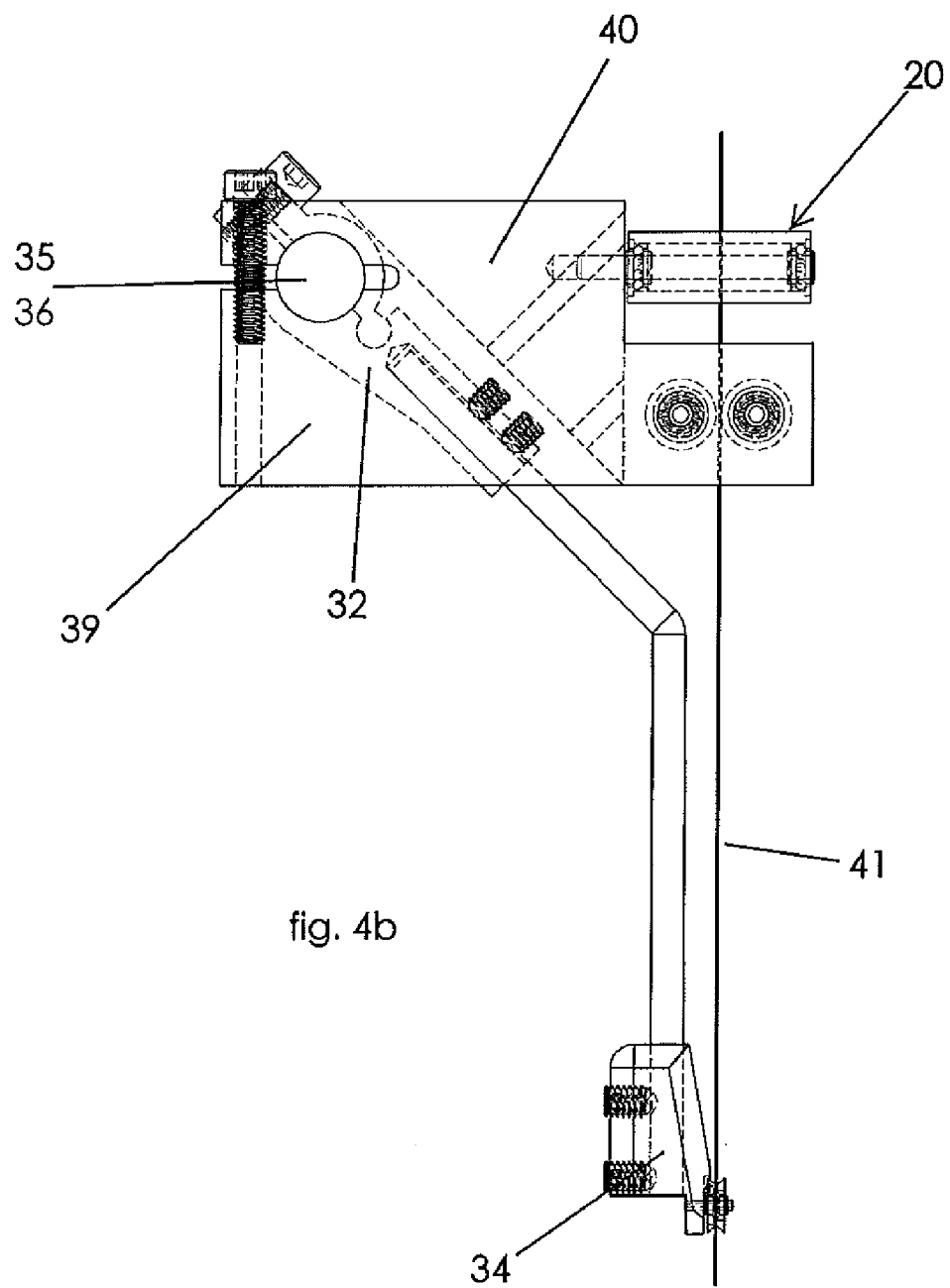
FIG. 4b is a side view of an embodiment of the guide outlining the internal notch in the top support.

Though the invention contemplates any suitable means for connecting the top guide and bottom guide so that they move as one entity, FIG. 4 shows a preferred embodiment of the rod/clamp style connecting means and the preferred top guide 20 that attaches to a bar in a rachel knitting machine. This design enables to the top guide to be set at a plurality of vertical angles. FIG. 4a is exploded view depicting top support 21, clamp 32, rod 33 and bottom guide 34. Top support 21 contains top support circular notches 35. Clamp 32 with circular clamp notch 36 attaches to a top end 37 of rod 33 and bottom guide 34 attaches to a bottom end 38 of rod 33. FIG. 4b shows side view of top guide 20 with internal notch 39 is outlined. Internal notch 39 in top support 21 is comprised of a diagonal supporting wall 40, opening 26 on top of top support 21 (FIG. 3a), opening 27 on bottom of top support 21 (FIG. 3b) and opening 28 on back of top support 21 (FIG. 3d). Clamp 32 and rod 33 are placed within internal notch 39. Clamp circular notch 36 matches up with top support circular notches 35 at a plurality of angles allowing top guide 20 to sit at a plurality of angles in relation to bottom guide 34 while still being able to align delicate fiber 41 in the horizontal and front to back directions.

Figure 5:
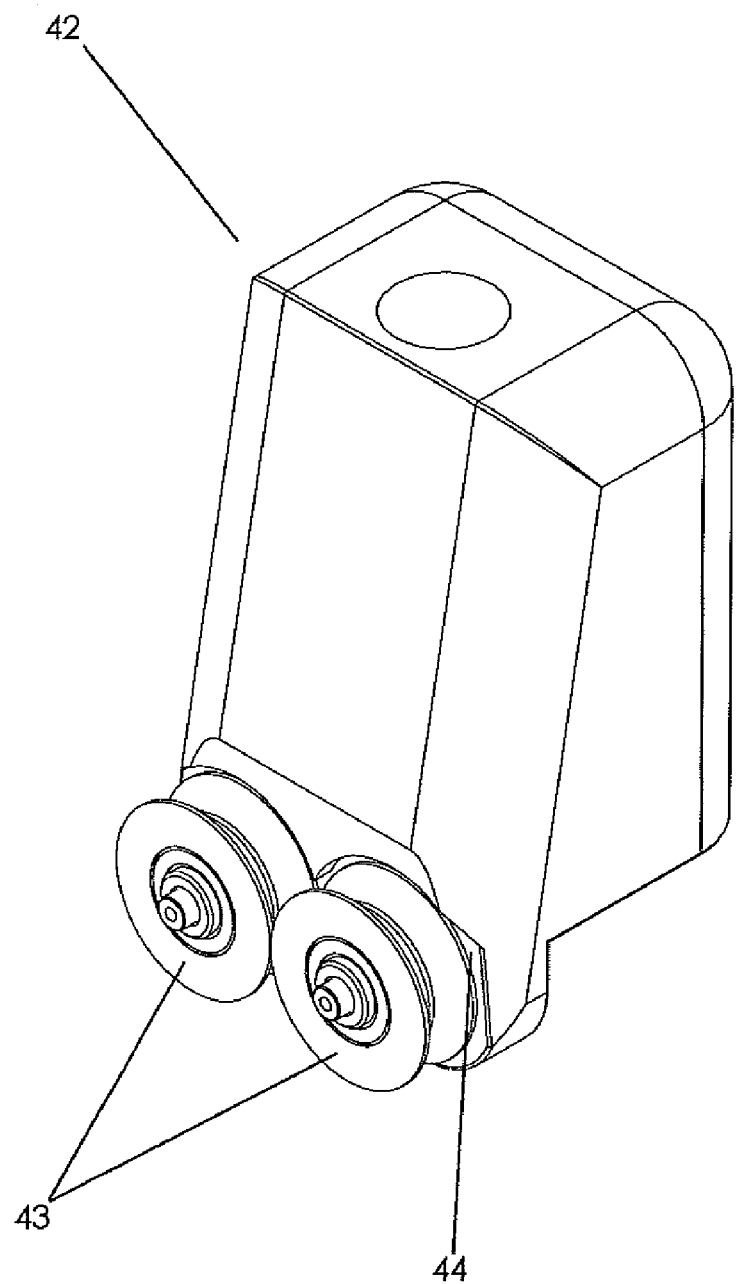
FIG. 5 shows an embodiment of the bottom support with an indentation for placement of the pulleys.

FIG. 5 depicts a preferred embodiment of bottom support 42. On the side where the pulleys 43 are attached there is an indentation 44. This allows for more precise vertical alignment of the delicate fiber to be fed into a knitting machine.

Figure 6A:
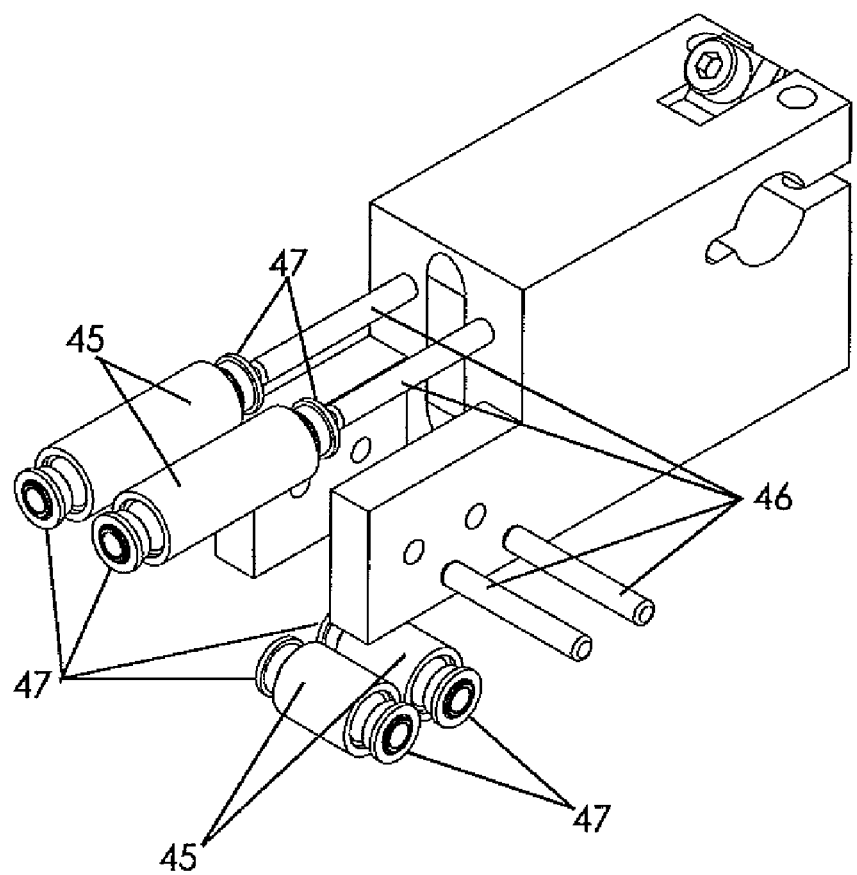
FIG. 6a illustrates an embodiment of the free rotation components of the uppermost rollers.
Figure 6B:
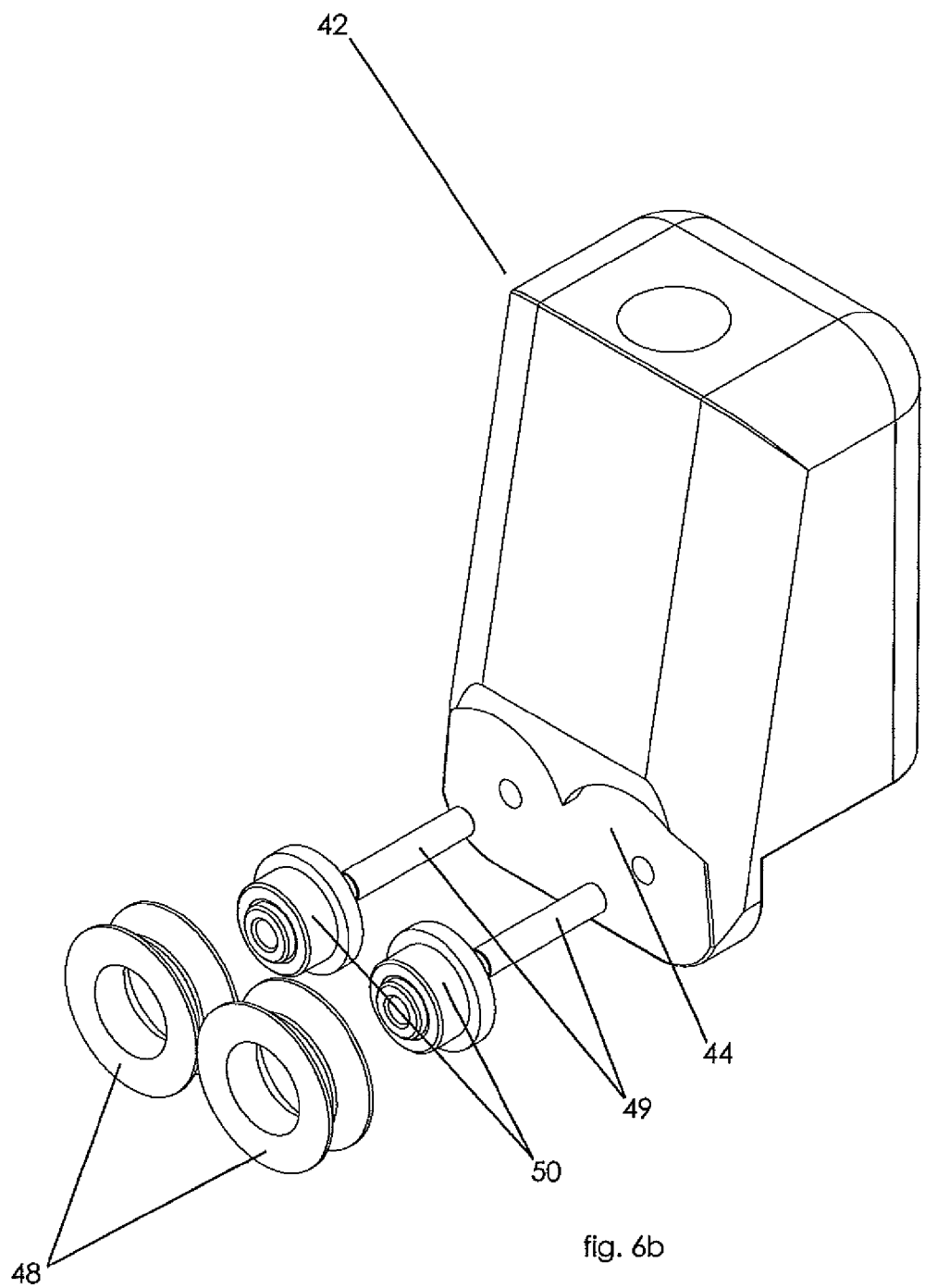
FIG. 6b illustrates an embodiment of the free rotation components of pulleys.

Rollers and pulleys are to be freely rotating allowing for only dynamic and not static friction. Preferred embodiments rollers and pulley wheels utilize precision ball bearings for free rotation. Most preferred are double-shielded bearings with an extended inner ring. FIG. 6a depicts free rotation components of the top guide rollers. Cylinder 45 rotates around axel 46 using ball bearing 47. FIG. 6b depicts the free rotation components of the pulley wheels. Pulley wheel 48 rotates around axle 49 utilizing ball bearing 50. It is preferred that pulley wheels be the smallest diameter so that it does not flatten the hollow fiber with at least a 20:1 ratio with the diameter of the hollow fiber.

The preferred material for all parts is to be as lightweight and as smooth as possible. It is preferred that the top guide rollers be made out of acetal copolymer. It is preferred that the pulley wheels are made of titanium. It is also preferred that the top and bottom supports be made out of aluminum or titanium or alloys thereof.

Though ideally the feeding and knitting of a hollow fiber should be a smooth and steady process, the constant movement can cause alterations. The atraumatic fiber guide design allows the hollow fiber alignment to be maintained, without having to stop and adjust. The atraumatic fiber guide described can be used with multiple machine designs that use overhead feeders.

The foregoing description merely illustrates the invention is not intended to be limiting. It will be apparent to those skilled in the art that various modifications can be made without departing from the inventive concept. Accordingly it is not intended that the invention be limited except by the appended claims.

What is claimed is:

1. A device for guiding a delicate fiber into a machine, said device comprising a bottom guide and a top guide, the bottom guide and top guide being joined by a connecting means which allows both guides to move together as one unit; the top guide comprising a top support with a means for attaching to the machine and at least two pairs of freely rotating rollers attached to the top support, one roller pair being lowermost and having rollers narrowly spaced apart to aligned the delicate fiber with the bottom guide and for orienting the delicate fiber in a front-to-back position relative to the bottom guide and a second roller pair being uppermost and orienting the delicate fiber in a side-to-side position, and the second roller pair having rollers sufficiently spaced apart to allow for an overhead access of the delicate fiber from a plurality of angles, wherein the device moves back and forth as one unit in a side-to-side orientation relative to the overhead access while guiding the delicate fiber into a machine, wherein movement of the freely rotating rollers is generated by dynamic friction of the delicate fiber passim through the device, the lengths of the freely rotating rollers are long enough to allow for maintenance of alignment of the delicate fiber while passing through the device, and wherein the delicate fiber is unaltered while passing through the device.

2. The device of claim 1, wherein said top support comprises a means for attaching to a substantially horizontal moving component of a knitting machine.

3. The device of claim 1, wherein the connecting means allows the top guide to sit at a plurality of angles relative to the bottom guide.

4. The device of claim 1, wherein the bottom guide includes a pair of freely rotating pulley wheels attached to a bottom support, and wherein movement of the freely rotating pulley wheels is generated by dynamic friction of the delicate fiber passing through the freely rotating pulley wheels.

5. The device of claim 4, wherein each freely rotating pulley wheel comprises: a grooved wheel, a precision ball bearing, and a coil spring pin.

6. The device of claim 4, wherein the pulley wheels have a diameter at least 20 times greater than the diameter of the delicate fiber being guided there through.

7. The device of claim 4, wherein the bottom support has an indentation through which the pair of pulleys attaches.

8. The device of claim 1, wherein the freely rotating rollers each comprise: a cylinder, a precision ball bearing, and an axle.

9. The device of claim 1, wherein the connection means includes: a rod attached to a clamp, said rod comprised of a bottom end and a top end, said bottom end is attached to the bottom guide and said top end is attached to the clamp, said clamp and said top end of rod are inserted into the top support via an internal notch within the top support, said internal notch comprising an internal diagonal supporting wall and said top support having a top opening, a bottom opening and a rear opening, whereby said clamp attached to said top end can be positioned within the internal notch of the top support to allow the top guide to sit at a plurality of angles relative to the bottom guide.

10. The device of claim 9, wherein the clamp has clamp circular notch and said clamp circular notch aligns with circular notches in the top support allowing the device to sit at a plurality of angles relative to the machine, while simultaneously allowing the top guide to sit at a plurality of angles relative to the bottom guide.

11. A method for guiding a delicate fiber from a feeding mechanism into a knitting machine that comprises:

providing a device comprising a bottom guide and a top guide, the bottom guide and top guide being joined by connecting means which allows both guides to move together as one unit and allows the top guide to sit at a plurality of angles relative to the bottom guide, the top guide comprising a top support with a means for attaching to the machine and at least two pairs of freely rotating rollers attached to the top support, one roller pair being lowermost and having rollers narrowly spaced apart to aligned the delicate fiber with the bottom guide for orienting the delicate fiber in a front-to-back position relative to the bottom guide and a second roller pair being uppermost and orienting the delicate fiber in a side-to-side position, and the second roller pair having rollers sufficiently spaced apart to allow for overhead access of the delicate fiber from a plurality of angles; and feeding said delicate fiber via a feeding mechanism into the top guide from an overhead access, having the delicate fiber pass through the freely rotating rollers of the top guide into the bottom guide, the delicate fiber being aligned with the bottom guide, and the bottom guide then directing the delicate fiber into the knitting machine;

wherein the device moves back and forth as one unit in a side-to-side orientation relative to the overhead access while guiding the delicate fiber into a machine, wherein the means for attaching cooperates with the connecting means to allow the top guide to sit at a plurality of angles relative to the bottom guide, wherein movement of the freely rotating rollers is generated by dynamic friction of the delicate fiber passing through the device, wherein the lengths of the freely rotating rollers are long enough to allow for maintenance of alignment of the delicate fiber while passing through the device, and wherein the delicate fiber is unaltered while passing through the device.

12. The method of claim 11, wherein the delicate fiber being guided is a hollow fiber.

13. The device of claim 11, wherein the device comprises a means for attaching to a horizontal movement mechanism of the knitting machine that includes a pair of circular notches in a rear wall of said top support.

14. The device of claim 11, wherein the bottom guide is comprised of a pair of freely rotating pulley wheels attached to a bottom support and wherein movement of the freely rotating pulley wheels is generated by dynamic friction of the delicate fiber passing through the freely rotating pulley wheels.

15. The device of claim 11, wherein the connection means is a rod attached to a clamp, said rod comprised of a bottom end and a top end, said bottom end is attached to the bottom guide and said top end is attached to the clamp, said clamp and said top end of rod are inserted into the top support via an internal notch within the top support, said internal notch comprising an internal diagonal supporting wall, a top support with a top opening, a bottom opening and a rear opening, whereby said clamp attached to said top end can be positioned within the internal notch of the top support to allow the top guide to sit at a plurality of angles relative to the bottom guide.

16. The device of claim 15, wherein the clamp has clamp circular notch, said clamp circular notch aligns with circular notches in the top support allowing the device to sit at a plurality of angles relative to the machine, while simultaneously allowing the top guide to sit at a plurality of angles relative to the bottom guide.

17. The method of claim 14, wherein the bottom support has an indentation through which the pulley wheels attach.

18. The method of claim 11, wherein the knitting machine is a rachel knitting machine.

19. The method of claim 11, wherein each freely rotating roller is comprised of a cylinder, a precision ball bearing and an axle.

20. The method of claim 14, wherein each freely rotating pulley wheel is comprised of a grooved wheel, a precision ball bearing and a coil spring pin.

21. The device of claim 3, wherein said means for attaching comprises a pair of circular notches in a rear wall of said top support allowing the device to sit on the horizontal moving component at plurality of angles relative to the machine.

22. The device of claim 1, wherein the means for attaching cooperates with the connecting means to allow the top guide to sit at a plurality of angles relative to the bottom guide.

* * * * *